(12) United States Patent
Richard et al.

(10) Patent No.: US 6,366,593 B1
(45) Date of Patent: Apr. 2, 2002

(54) ADHESIVE PRECISION POSITIONING MOUNT

(75) Inventors: Derek J. Richard, Pleasanton; Mark Byer, Mountain View; Gerald Mitchell, Los Altos; George Conway, San Mateo, all of CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 0 days.

(21) Appl. No.: 09/452,767

(22) Filed: Dec. 1, 1999

(51) Int. Cl.[7] .................................. H01S 3/04
(52) U.S. Cl. ............................ 372/36; 372/34
(58) Field of Search ..................... 372/34, 36; 156/60

(56) References Cited

U.S. PATENT DOCUMENTS

| | | | |
|---|---|---|---|
| 4,466,102 A | 8/1984 | Woste | 372/53 |
| 4,802,177 A * | 1/1989 | Yamagishi et al. | 372/36 |
| 4,827,485 A | 5/1989 | Scerbak et al. | 372/107 |
| 5,170,409 A | 12/1992 | Nightingale et al. | 372/107 |
| 5,633,527 A * | 5/1997 | Lear | 257/432 |
| 5,975,669 A * | 11/1999 | Ohshima | 347/14 |

* cited by examiner

*Primary Examiner*—James W. Davie
*Assistant Examiner*—James Menefee
(74) *Attorney, Agent, or Firm*—Lumen Intellectual Property Services, Inc.

(57) ABSTRACT

A precision positioning mount for UV-cured adhesives that provides adhesive junctions between modular assembly mounts and structural elements. Contact edges are placed on a first fixating area of an adhesive junction. The contact edges are pronounced edges of faces that slide along a second fixating area during the adjustment process. Thus, the assembly modules and structural elements are precisely referenced before, during and after their positioning and orientating. First and second fixating areas form a cavity that provides a volume for the adhesive. The mounts and structural elements are preferably made of sapphire for increased thermal conductivity. The elements of the assembly mounts are modular and interchangeable and provide various positioning modes.

12 Claims, 6 Drawing Sheets

ADHESIVE PRECISION POSITIONING MOUNT

FIELD OF THE INVENTION

The invention relates in general to positioning mounts for optical assemblies or components, and in particular to positioning mounts that are adhesively fixated.

BACKGROUND OF INVENTION

Optical assemblies or components like for instance laser resonance assemblies feature a number of components that need to be precisely aligned relative to each other.

A typical optical assembly consists mainly of a planar assembly platform on which a number of devices are positioned relative to each other. The devices are attached to pedestals that provide varying degrees of freedom in the positioning.

U.S. Pat. No. 4,466,102 describes a modular dye laser. The pedestals introduced in this patent are mainly stacked plates that can slide along the planar top surface of a modular assembly platform. No specific method is provided to fixate the pedestals in the defined test position.

U.S. Pat. No. 4,827,485 describes a diode pumped solid state laser that is placed on a pedestal including an adjustment mechanism of essentially two wobble plates that can be rotated against each other. The pedestal provides a limited vertical adjustment without any fixating feature.

To fixate optical assemblies or components in their designated position the pedestals are typically soldered onto the assembly platform. The soldering process places an unfavorable thermal load on the assembly. Soldering of the pedestals themselves is also hard to accomplish without distorting the adjusted shape. The adjusted shape is defined of a number of individual mounts positioned in a friction resistant manner relative to each other.

UV-curing adhesives have been utilized to circumvent the problems associated with the soldering technique. Pedestals or mounts are at least partially made of translucent material such that a curing UV-light can be directed onto the adhesive film between the individual mounts.

U.S. Pat. No. 5,170,409 describes a laser resonator assembly that utilizes a translucent assembly platform on which the individual components of the laser resonator assembly are positioned. The individual components are adhesively attached to blocks that are also translucent. The invention provides a simple method to position and fixate the individual components.

Unfortunately, the manually applied adhesive cannot be applied evenly, which results in level differences between the individual components. Another shortcoming is that the adhesive with its relatively low viscosity and non-existent stiffness makes it difficult to maintain the defined position during the curing process. A further shortcoming is that the adhesive changes slightly its volume during the curing process, which also causes displacement of the individual components respectively within the pedestal mount. A further shortcoming is that the area at which the adhesive is applied is sensitive to unbalanced gravitational forces, which causes the adhesive to redistribute itself and consequently the blocks holding the individual components tilt. Another shortcoming is that the adhesive has a relatively high resilience, which causes the blocks to creep back towards the position prior to the positioning adjustment.

Therefore, there exists a need for a simple and economically fabricated mount that provides a free and precise positioning, which is maintained through the curing process.

OBJECTS AND ADVANTAGES

It is a primary object of the present invention to provide a mount that can be precisely adjusted and that maintains the adjustment position throughout a fixating process.

It is a further object of the present invention to provide an adhesive junction between a mount and a structural element that utilizes a UV-curing adhesive.

It is a further object of the present invention to provide geometric shapes for the adhesive junction that allow free three dimensional positioning and orienting.

SUMMARY

The present invention introduces mounts and structural elements that are adhesively attached to each other at adhesive junctions. The adhesive junctions consist of a moveable fixating area and a base fixating area. The moveable fixating area is typically part of a structural element designed to be adjusted relative to a mount. The base fixating area is part of the mount.

Contact edges are placed as boundaries on one of the fixating areas and snuggly contact the opposing fixating area.

During an adjustment process, while the adhesive has not been cured, the structural element can be adjusted relative to the mount. The contact edges slide in a predetermined fashion along the smooth surface of the opposing fixating area. The contact edges are typically at the edges of faces that are designated as fixating areas.

An adhesive film cavity is formed by the fixating area that features the contact edges. Since the contact edges are in direct contact with the opposing fixating area, the adhesive film cavity remains constant in shape and volume during the sliding adjustment process. The adhesive film cavity provides a sufficient volume for the adhesive between the fixating areas.

The contact edges provide a stiff contacting and referencing of the structural element relative to the mount. As a result, the contact edges make the adhesive junction form stable and independent of any redistribution of the adhesive between the fixating areas during the sliding adjustment.

The base fixating area can be a single planar face, which allows precise sliding and adjusting of the structural element in any direction and orientation within the plane of the planar face.

The base fixating area can comprise two planar faces at an angle to each other. This allows free and precise sliding and positioning of the structural element in the direction of intersection line between the two planar faces.

The base fixating area can be a cylindrical face, which allows precise sliding and adjusting of the structural element in any orientation around the axis of revolution of the cylindrical face and in any position in direction of the axis of revolution.

The base fixating area can be a conical face, which allows precise sliding and adjusting of the structural element in any orientation around the axis of revolution of the cylindrical face.

The base fixating area can be a spherical face, which allows precise sliding and adjusting of the structural element in any orientation around the center point of the spherical face.

The five basic geometric functions of the adhesive junction are implemented in a number of basic modules that can be combined with each other to build tree like assembly mounts. These assembly mounts are able to position and fixate according to the needs of any optical assembly.

The preferred material used for mounts and/or structural elements is sapphire, which has sufficient optical properties to direct the UV-light onto the adhesive during the curing and to be utilized as a functional part of the optical assembly. Sapphire has a relatively good thermal conductivity compared to other translucent materials such that it is able to drain and dissipate thermal energy, which is imposed on a structural element during the operation of the optical assembly.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
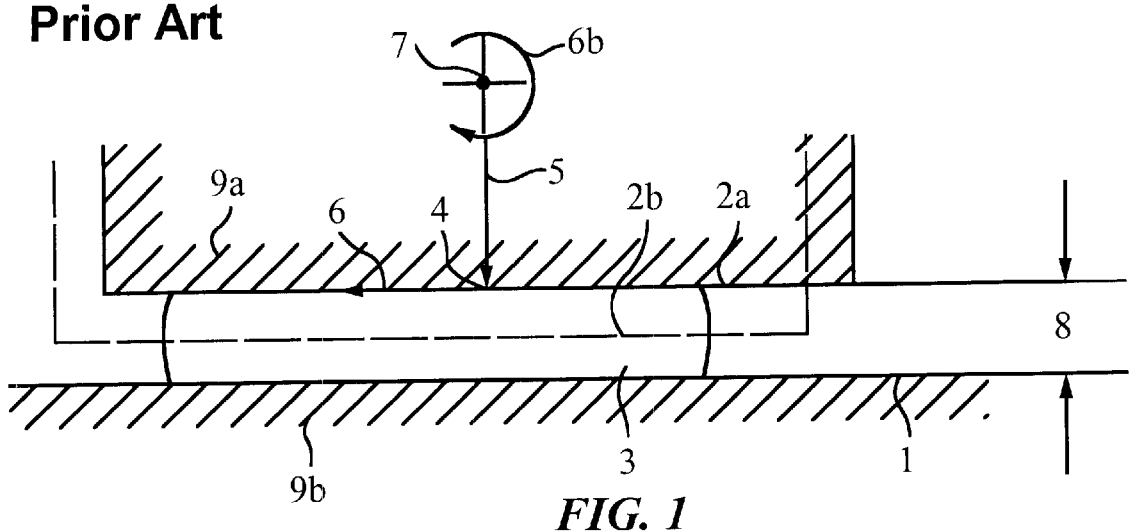
FIG. 1 shows a schematic section view of a prior art horizontal adhesive junction.
Figure 2:
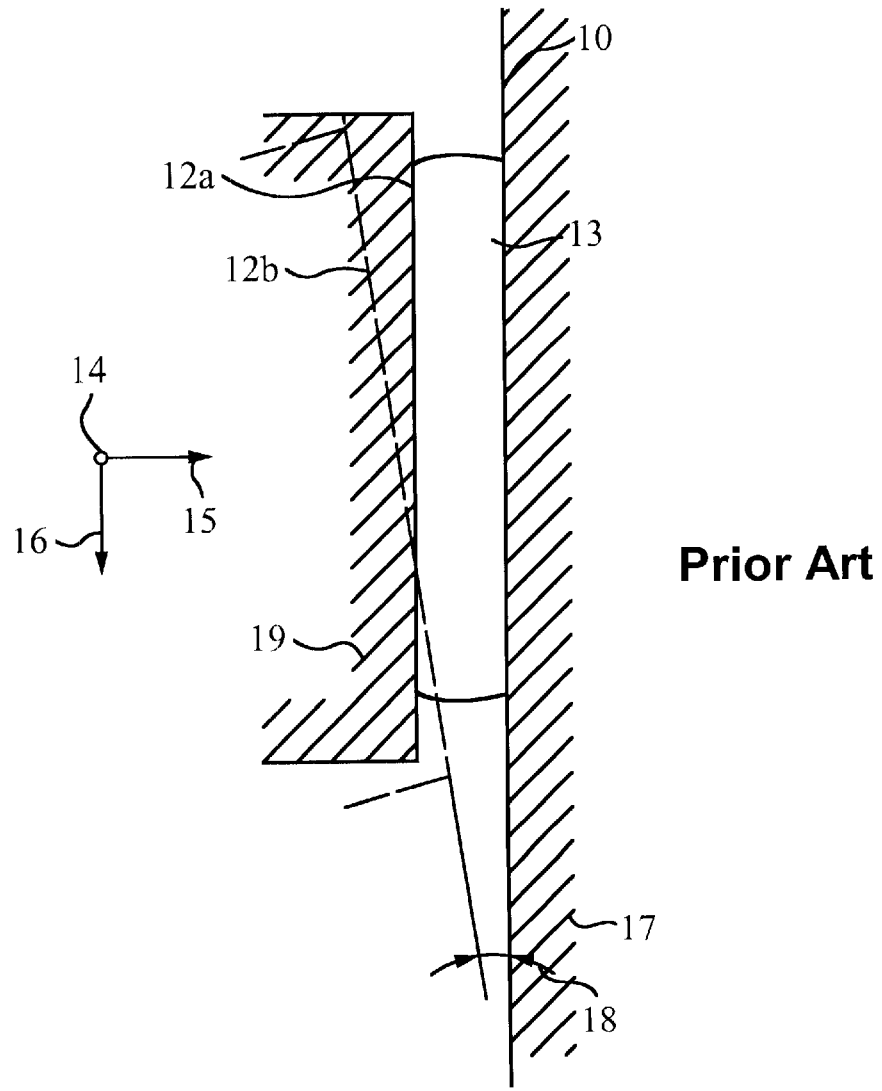
FIG. 2 shows a schematic section view of a prior art vertical adhesive junction.

To illustrate the improvements of the present invention FIGS. 1 and 2 visualize events related to the prior art at the end of a positioning operation of a typical structural element against a mount.

It is noted, that the mount can be an assembly plate as it is known for laser resonator assemblies and/or a conventional base plate or any other component in an assembly mount on which a pedestal can be positioned to carry typical components of a laser resonator assembly.

FIG. 1 shows the exemplary case of an essentially horizontal adhesive junction with an adhesive 3, 13, (see FIG. 2) filling the gap between the base fixating areas 1, 10 (see FIG. 2) and the moveable fixating areas 2a and 12a (see FIG. 2). The base fixating areas 1, 10 are in the examples of FIGS. 1 and 2 part of the mount. The moveable fixating areas 2a, 12a are in the examples of FIGS. 1 and 2 part of the structural element.

To position a structural element relative to the mount, a sheer force 6 and 16 (see FIG. 2) have to be applied to overcome the viscosity and resilience of the adhesive. In addition, a force 5 and 15 (see FIG. 2) has to be applied towards the mount to maintain the same gap distance 8 during the positioning and/or orienting of the structural element.

In the example of FIG. 1 the base fixating area 1 is part of a mount that is partially represented by the hatch lines 9b.

The moveable fixating area 2a is part of a structural element that is partially represented by the hatch lines 9a.

FIG. 1 shows the ideal case, where the force center point 4 is essentially within the moveable fixating area 2a. In the typical case of a free-hand positioning, a torque 6b is applied by the operator at the manipulation point 7. The torque 6b corresponds ideally to the normal distance 7a times the sheer force 6.

At the end of the positioning movement the structural element is brought into its designated position, which is represented by the dotted fixating area 2b. Typically, the adhesive 3 has a resilience, which causes the structural element to creep back towards the position prior to the adjustment. Consequently, the structural element is brought out of its designated position.

In the example of FIG. 2 the base fixating area 10 is part of a mount that is partially represented by the hatch lines 17. The moveable fixating area 12a is part of a structural element that is partially represented by the hatch lines 19.

FIG. 2 shows a practical case, where the torque 6b is applied incorrectly, as it is typical for a manually positioning operation. As a result, the real force center 14 is at a distance to the moveable fixating area 12a. The adhesive 13 becomes unevenly pressurized and redistributes itself over the applied area such that the moveable fixating area 12a is brought into improper orientation 12b relative to the base fixating area 10, which is represented by a vertical offset angle 18.

A structural element typically has a mass and a center of mass at which the gravitation force acts on it.

In one exemplary case, the structural element functions as a mount and combines further structural elements in a subassembly. The subassembly's sum center of mass may be thereby in a significant horizontal distance to the real center point of the adhesive junction.

In another exemplary case, the structural element 28 has a shape with the center of mass being in a horizontal distance to the areal center of the adhesive junction.

In a further exemplary case, the adhesive junction is so narrow and/or at such angular orientation that it does not reach beneath and/or is off centered from the structural element's gravitational force vector.

As a result of the cases described in the three paragraphs above, a redistribution of the adhesive takes place. The redistribution is dependent: first, the proportion between thickness, areal extension and viscosity of the adhesive and second, the amount of gravitational force and its distance to the areal center of the adhesive junction.

Conventional adhesives have a sticking characteristic. Hence, the adjustment range of an adhesive junction is limited by smearing the adhesive out of the adhesive junction onto the surrounding surfaces.

Conventional adhesives are typically manually applied between the moveable fixating areas 2a, 12a, and the base fixating areas 1 and 10. The amount of applied adhesive at a given area of the adhesive junction defines the gap distance between the moveable fixating areas 2a, 12a and the base fixating areas 1 and 10. Since the amount of applied adhesive in a typical manual application cannot be precisely defined. The gap distance 8 is consequently uncontrollable in prior art adhesive connections.

Structural element and/or mounts that are preferably utilized in laser resonance assemblies and/or other optical assemblies are typically made of glass and/or other translucent materials with high rigidity and surface hardness. They incluce precise and smooth surfaces that are suitable for optical applications.

Figure 3:
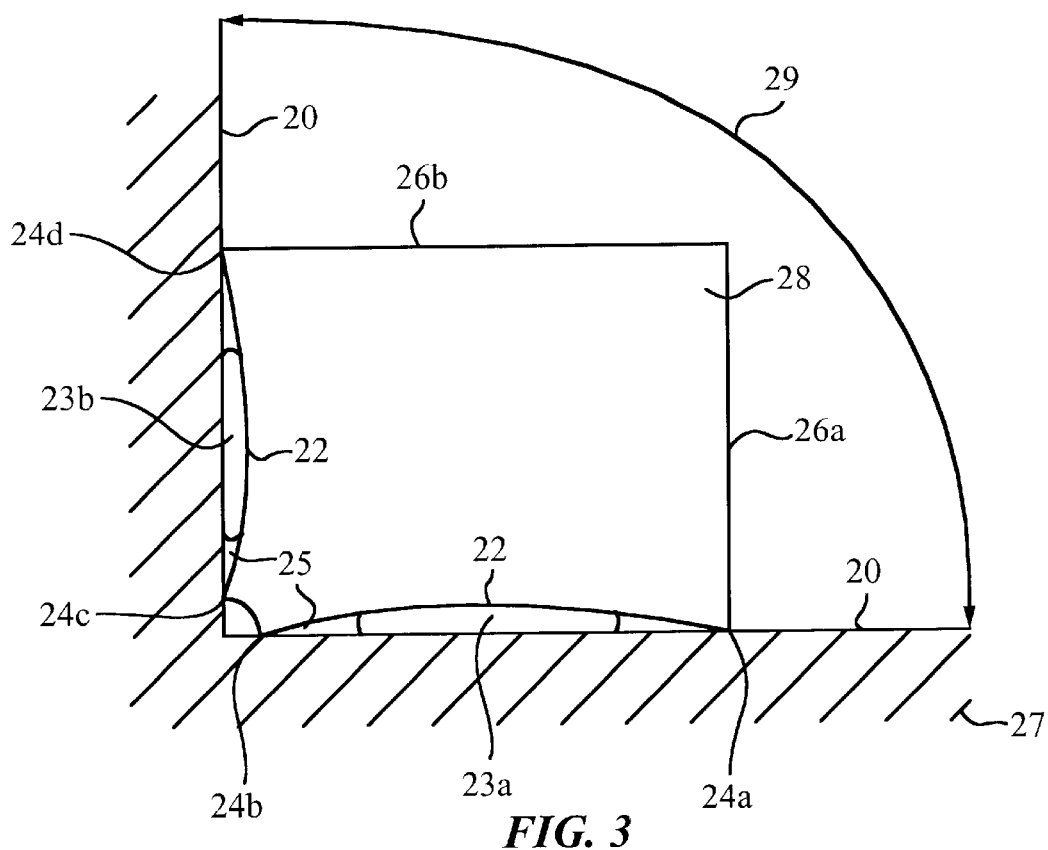
FIG. 3 shows an exemplary schematic section view of an adhesive junction having a fixating area with planar faces.
Figure 4:
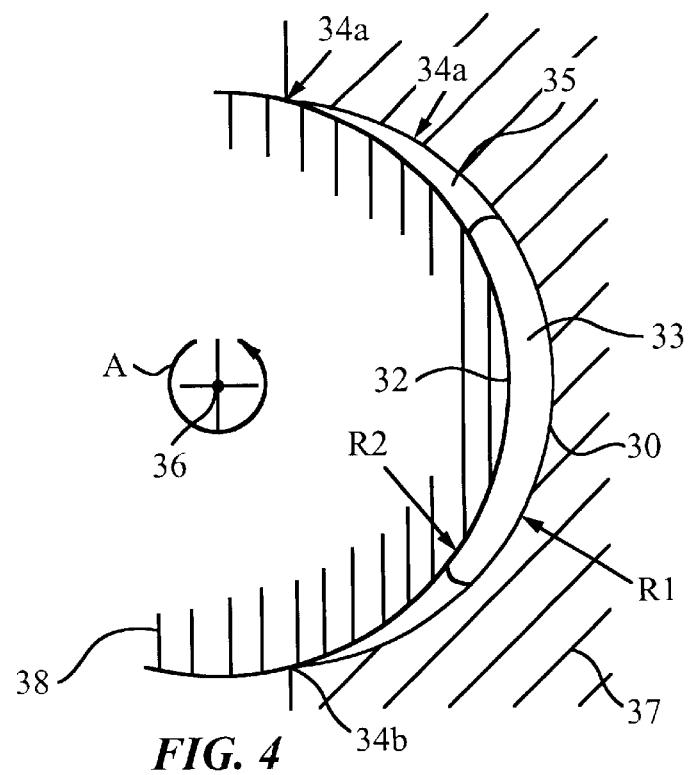
FIG. 4 shows an exemplary schematic section view of an adhesive junction having a curved fixating area.

The present invention utilizes structural element 28 (see FIG. 3) with smooth surfaces to introduce contact edges 24a, 24b, 24c, 24d, 34a, 34b, 55, (see FIGS. 3, 4 and 5) that are either part of the moveable fixating areas 22, 32 (see FIGS. 3 and 4) or the base fixating areas 20 and 30 (see FIGS. 3 and 4). The contact edges 24a, 24b, 24c, 24d, 34a, 34b, and 55 are physically contacting over the length of the opposing fixating area and are designated to slide along them. They have a curvature, position and orientation such that they provide a snug fit to the corresponding base fixating areas 20 and 30.

The contact edges are preferably combined in sets of two to provide a full three dimensional reference contact. The contact edges 24a, 24b, 24c, 24d, 34a, 34b, 55 provide a fully defined position and orientation along the fixating area, which they are contacting. The contact edges 24a, 24b, 24c, 24d, 34a, 34b, 55 are typically placed at significant edges of mounts and/or structural element 28.

The invention further introduces an adhesive film cavity 25 and 35 (see FIGS. 3 and 4), which is defined between the moveable fixating areas 22, 32 and the base fixating areas 20, 30.

A fully defined position of the structural element 28 relative to the base fixating areas 20, 30 is provided by the solid contact of the contact edges 24a, 24b, 24c, 24d, 34a, 34b, 55. As a result, the adhesive film cavity 25, 35 retains a constant shape and a constant volume during the adjustment process. The volume of the adhesive film cavity 25 and 35 is preferably defined by a curvature of the moveable fixating areas 22, 32 and/or the base fixating areas 20 and 30.

It is noted that the curvature may have any shape that can be fabricated and/or be the effect of a fabrication process utilized for mounts or structural element 28. In particular, a conventional thermal casting process used to produce a mount or a structural element 28 may be utilized and adjusted to form an adhesive film cavity 25 by controlling the shrinking process during the cooling period of the cast. The location and volume of the adhesive film cavity 25 is defined by: first, a material specific shrinking factor; second, by the ratio of the casting mass relative to the actual extension of the designated adhesive film cavity 25.

An equivalent shrinking process occurs during the curing process of resin-based casting methods and may also be utilized and adjusted to produce an adhesive film cavity 25 as described in the paragraph above.

FIG. 3 shows an exemplary section view with a structural element 28 being in contact with the base fixating area 20 of a mount via contact edges 24a, 24b, 24c and 24d. The adhesive film cavities 25 have a sufficient volume to compensate for varying applied amounts of adhesive 23a and 23b and remain partially filled.

In case the structural element is cast in a thermal casting process, the volume of the adhesive film cavities 25 is defined by the mass of the structural element 28 and shrinking factor of the chosen material. In case of a thermal casting process, the planar faces 26a and 26b are essentially utilized to drain the heat from the cast and to initialize the solidification. As a result, the planar faces 26a and 26b retain the shape that has been imposed on them by the mold and the moveable fixating areas 22 are buckled inwards as a result of the shrinking process.

The structural element 28 may be machined and/or altered as it is known to those skilled in the art to provide a final shape of the adhesive film cavity 25, 35.

It is noted, that the contact edges 24a, 24b, 24c and 24d may as well be points or areas of contact.

In the example of FIG. 3 the base fixating area 20 is part of a mount that is partially represented by the hatch lines 27 and is shown with two planar areas that are at an angle 29 to each other. As a result, the structural element 28 is fully defined by the contacting of the contact edges 24a, 24b, 24c and 24d in its orientation and defined in its position within the plane of the paper. The structural element 28 remains adjustable in its position along the axis perpendicular to the plane of the paper.

It is noted that the base fixating area 20 may be one planar in face, in which case the structural element 28 is positioned in any direction parallel to the fixating area 20 and is rotated into any orientation around axes that are perpendicular to the fixating area 20.

FIG. 4 shows an exemplary section view through a structural element partially visualized with the hatch lines 38 and the movable fixating area 32. A mount is partially visualized with the hatch lines 37 and the base fixating area 30. The moveable fixating area 32 has a radius R2, which is larger than the radius R1 of the base fixating area 30. As a result, the adhesive film cavity 35 is formed when the moveable fixating area 30 is contacting the contact edges 34a and 34b.

The adhesive junction pictured in FIG. 4 shows how an adhesive film cavity 35 may be formed from two non-planar fixating areas. In case the radii R1 and R2 revolve around one axis a pair of cylindrical or conical fixating areas is created. In case the radii R1 and R2 rotate around two perpendicular axes a pair of sperical fixating areas is created. In case of a pair of cylindrical or conical fixating areas, the contact edges 34a and 34b hold the structural element in position at the center point 36 of the radius R2. In addition, the axis of revolution of the moveable fixating area 32 is kept in constant orientation by the contact edges 34a and 34b. In case of a pair cylindrical fixating areas, the structural element is slideable positioned along the axis of revolution.

In case of a pair of spherical fixating areas, the contact edges 34a and 34b form a circle and hold the structural element in position at the center point 36 of the radius R2.

In the typical application for optical assemblies the mount and structural elements are preferably made of a translucent material. The adhesive 3, 13, 23a, 23b and 33 is preferably a UV-curing adhesive that is cured by directing UV-light through at least one translucent mount and/or structural element 28 onto the adhesive junction. In the present invention, adhesives are preferably utilized that are either free of volume changes or shrink in volume during the curing process. In that way, the established precise positioning of structural elements relative to the mount is not compromised by moving the contact edges 24a, 24b, 24c, 24d, 34a, 34b and 55 out of contact with the corresponding fixating area during the curing process.

The snug fit of the contact edges 24a, 24b, 24c 24d, 34a, 34b, 55, provide for precisely controlled sliding of the structural elements relative to the mount (and vice versa). The precise control of the sliding process is predetermined in orientation and position by varying combinations of planar and/or cylindrical and/or conical and/or spherical pairs of fixating areas. Structural elements may function themselves as mounts for further structural elements to form tree like assembly mounts. As a result, the degrees of freedom provided for the last link at the top of an assembly mount may be varied from zero degrees to seven degrees and more. The stiff characteristic in the adhesive junction supports higher numbers of individual components of a tree-like assembly mount. The mounts can be alternatingly opaque within the tree structure or have opaque layers such that each adhesive junction can be cured independently. Thus, a structural element that is attached as the last link in a tree like assembly mount may be brought into its final designated position by a step by step positioning and curing process, in which the degrees of freedom are reduced sequentially.

The contact edges perform a seal function due to their snuggly fit. As a result, sticking adhesive is wiped off the sliding fixating area and the adjustment range of an adhesive junction is increased without distributing the adhesive outside the adhesive junction.

Structural elements may be a part of and/or may be attached preferably to any operational element of an optical assembly. Operational elements are exposed to thermal energy that needs to be drained with a minimum of thermal expansion of the assembly mount. Ideally, generously sized mounts and structural elements with large adhesive junctions provide sufficient thermal conductivity.

To bring the element density for a given size of a test assembly platform to a maximum, mounts have to be small in size. The invention utilizes sapphire, which is rigid, has a sufficient surface hardness and optical properties and a relatively high thermal conductivity compared to other translucent materials.

The thermal conductivity in a tree-like assembly mount is also dependent on the areal extension, the film thickness defined by the gap distance 8 and the thermal conductivity of the adhesive film.

The thermal conductivity from source to drain must be at a level that a first thermal load of the operational element remains below a first critical temperature. The first critical temperature may be defined by the operational element and/or by the process that is supported by the operational element.

The thermal conductivity from source to drain must be at a level that a second thermal load of the operational element remains below a second critical temperature. The second critical temperature may be defined by a thermally dependent physical strength limit of the adhesive.

FIGS. 5, 6, 7, 8 and 9 show examples of assembly mounts consisting of structural elements and mounts.

Figure 5:
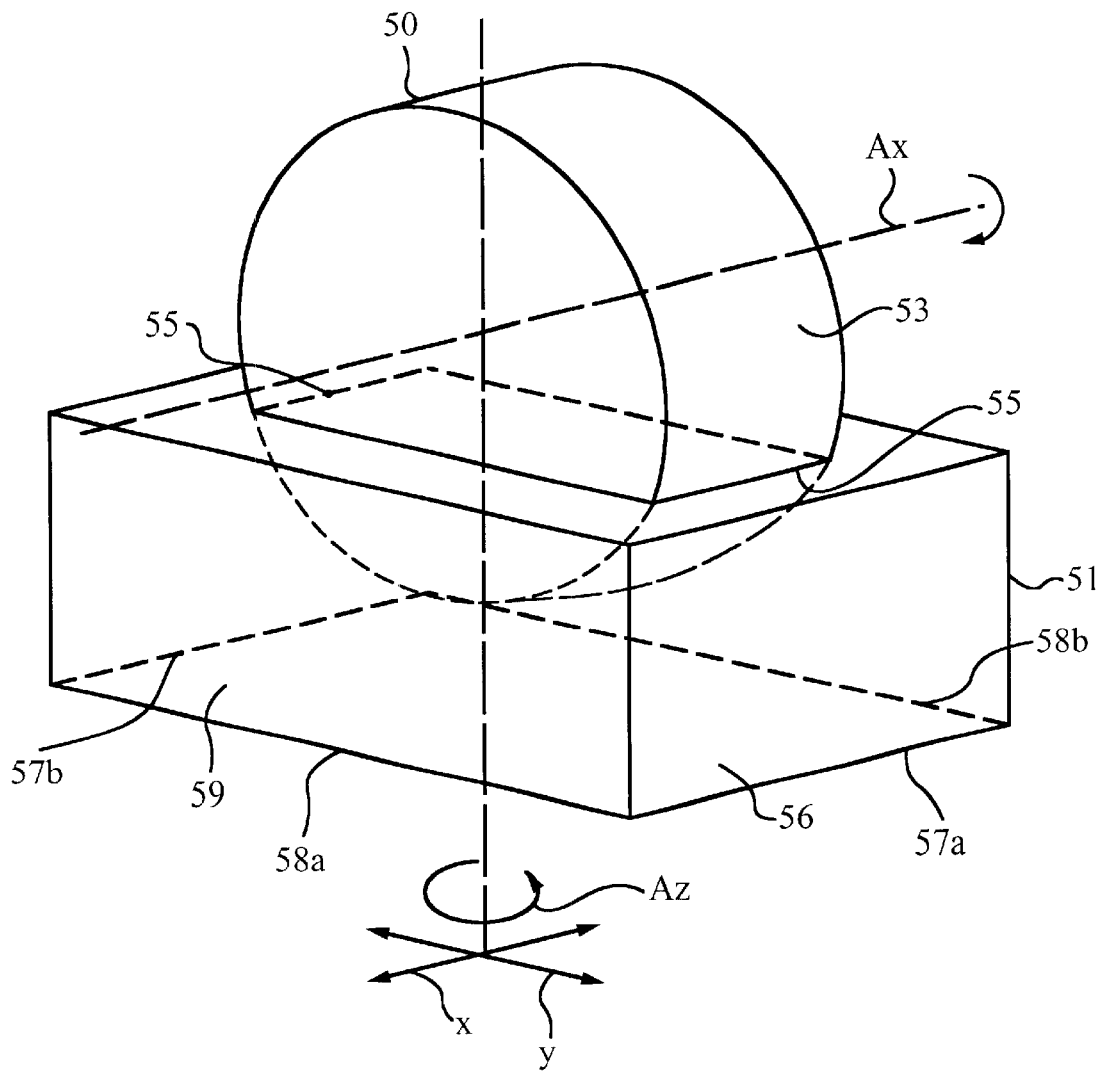
FIG. 5 shows a first exemplary assembly of the present invention.

FIG. 5 shows an assembly mount that provides 4 degrees of freedom. The cylindrical structural element 50 rotates around the axis Ax by sliding with the movable fixating area 53 along the contact edges 55 (one of them is invisible and shown as a dotted line) as described under FIG. 4.

The mount 51 has on its bottom side an adhesive film cavity 59 between the invisible contact edges 57b and 58b (shown as dotted lines) and can be rotated vertically, which is shown by the arrow Az. The mount 51 can also be moved in direction of X and/or Y along a conventional assembly platform.

The mount 51 may have an adhesive film cavity on its vertical face 56 with at least one pair of face edges being formed as contact edges. For planar faces, the contact edges can be at any angle to each other and can also intersect with each other. They are preferably straight, but may be curved under the condition that the resulting contacting points are within a single plane.

Figure 6:
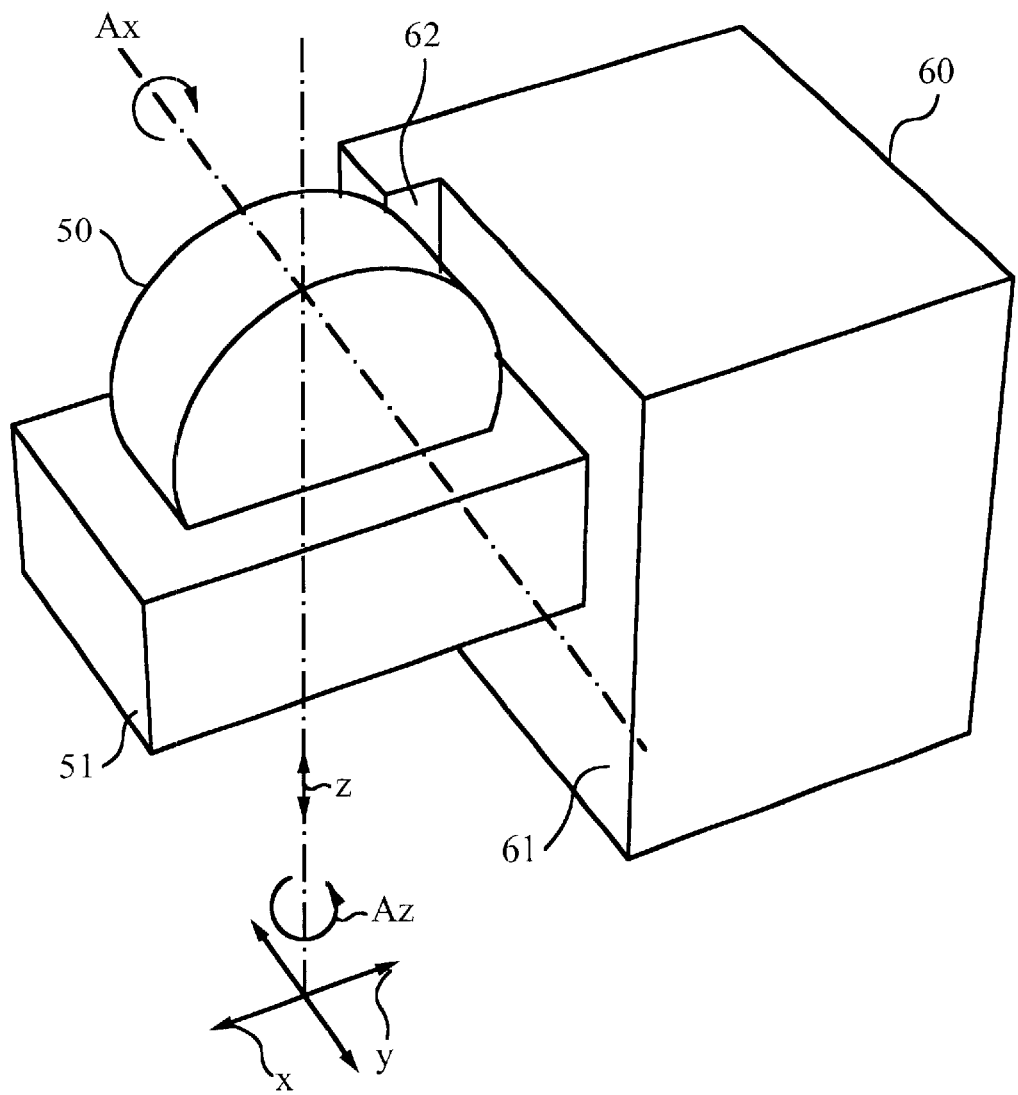
FIG. 6 shows a second exemplary assembly of the present invention.

FIG. 6 shows the assembly mount of FIG. 5 being adhesively attached to a further mount 60. The further mount 60 has a fixating area consisting out of the two faces 61 and 62 as it is explained under FIG. 3. The faces 61 and 62 are planar and preferably vertical. The bottom face (not shown) of the further mount 60 has an adhesive film cavity as described under FIG. 5. The further mount 60 adds one degree of positioning freedom in vertical direction Z.

Figure 7:
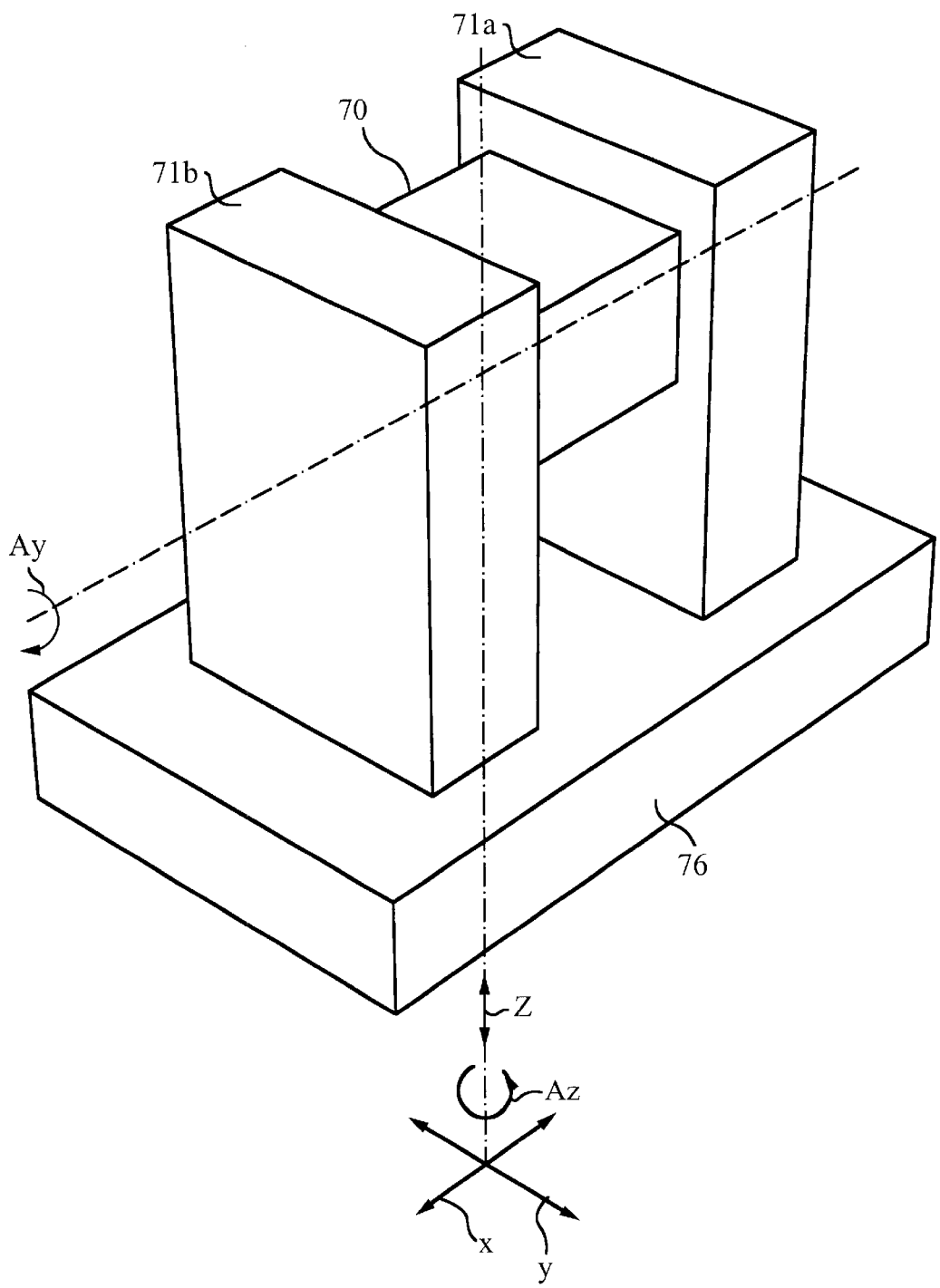
FIG. 7 shows a third exemplary assembly of the present invention.

FIG. 7 shows an assembly mount with two vertical mounts 71a and 71b that hold the structural element 70 from both sides. This assembly mount provides an increased mechanical strength and simultaneously an increased thermal conductivity. A thermal energy imposed on the structural element 70 drains into both vertical mounts 71a and 71b where it is transmitted into the base mount 76 and consequently into the assembly platform.

All adhesive junctions have planar base fixating areas. As a result, the assembly mount shown in FIG. 6 has three degrees of positioning freedom along X, Y and Z direction and two degrees of rotational freedom visualized by Ay and Az.

Figure 8:
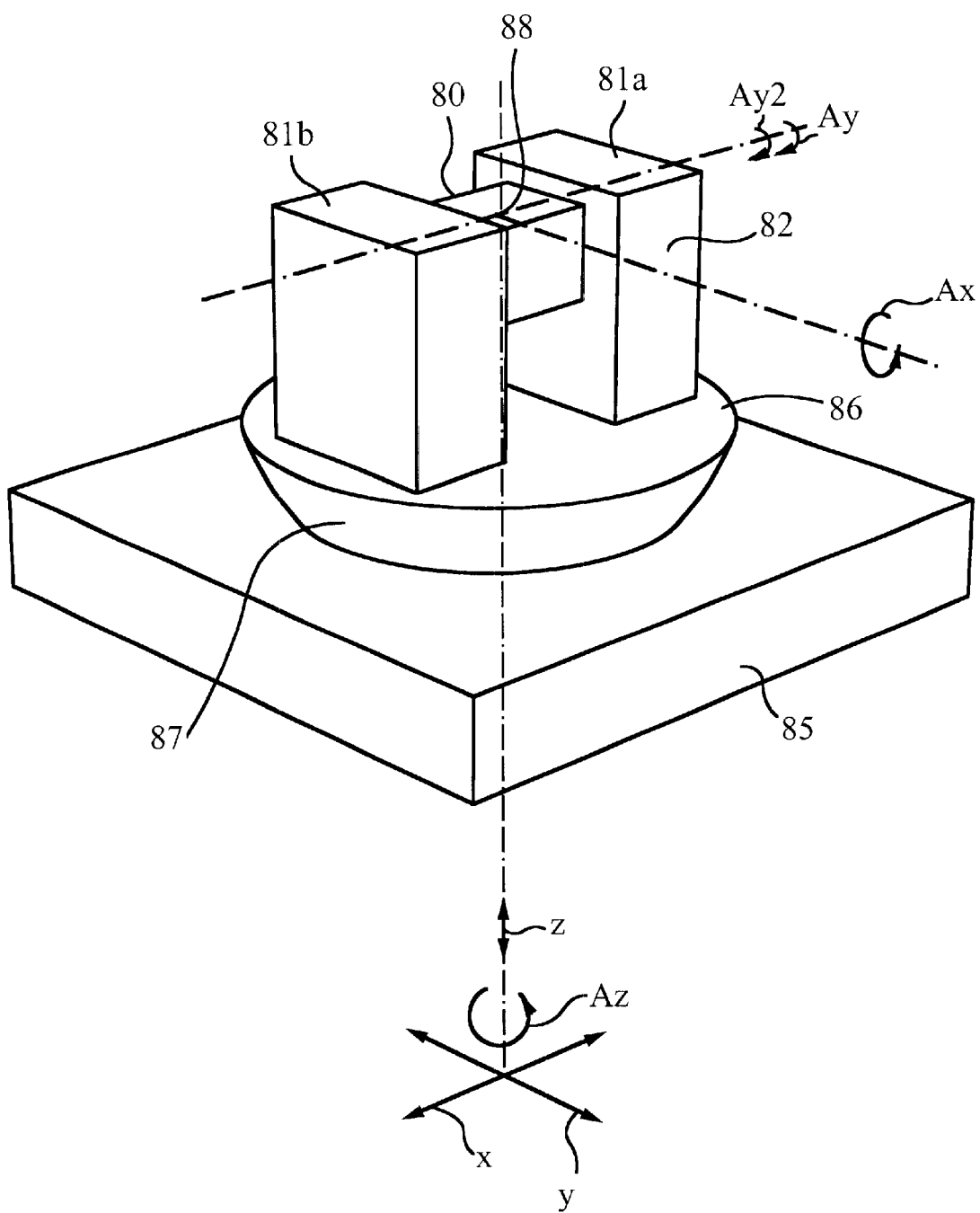
FIG. 8 shows a fourth exemplary assembly of the present invention.

FIG. 8 shows an assembly mount with a structural element 80 being adhesively attached to two vertical mounts 81a and 81b as described under FIG. 7. The vertical mounts 81a and 81b are adhesively attached to the planar top face 86 of the sphere segment mount 87. The sphere segment mount 87 pivots within the base mount 85 around the sphere center-point 88 as described under FIG. 4.

The sphere segment mount 87 provides additional two degrees of rotational freedom compared to the assembly mount of FIG. 7. The two additional degrees of freedom are visualized by the arrows Ax and Ay2.

The assembly mount of FIG. 8 provides an alternate combination of the building elements of the invention shown in FIG. 7. It provides advantageous thermal and mechanical properties as described under FIG. 7.

The sphere segment mount 87 with its extensive adhesive junction may be utilized for a rough orientation of the structural element and initially fixated.

It is appreciated that the adhesive junction may be partially combined or exchanged with conventional attachments like for instance screws or bolts between mounts and/or structural elements that do not need to be adjusted relative to each other.

The elements utilized in the assembly mounts are modular and interchangeable. The increased precision and stiffness of the inventive adhesive junction allows a relatively high variety of different assembly mounts made from a relatively small number of individual components.

It is appreciated, that moveable fixating areas and base fixating areas may be placed alternatingly either on a structural element or on a mount. The base fixating area can be a single planar face, which allows precise sliding and adjusting of the structural element in any direction and orientation within the plane of the planar face.

It is also noted, that the base fixating area can be two planar faces in an angle to each other, which allow precise sliding and adjusting of the structural element in the direction of intersection line between the two planar faces.

It is further noted, that the base fixating area can be a cylindrical face, which allows precise sliding and adjusting of the structural element in any orientation around the revolution axis of the cylindrical face and in any position in direction of the revolution axis. Also, that the base fixating area can be a conical face, which allows precise sliding and adjusting of the structural element in any orientation around the revolution axis of the cylindrical face. Alternatingly, the base fixating area can be a spherical face, which allows precise sliding and adjusting of the structural element in any orientation around the center point of the spherical face.

Finally, it is noted that all figures and schematic views are shown for the sole purpose of visualization without any claim for accuracy. The assembly examples shown in the FIGS. 5, 6, 7 and 8 may be exchanged with others as it is obvious from the specifications made under FIGS. 3 and 4.

Accordingly, the scope of the invention should be determined by the following claims and their legal equivalents.

What is claimed is:

1. A mount and a structural element having at least one adhesive junction with said mount, said adhesive junction comprising:
    a) a base fixating area being essentially rigid and being part of said mount;
    b) an adhesive having an adjustment viscosity and a fixating viscosity; and
    c) a moveable fixating area being essentially rigid and being part of said structural element, said moveable fixating area contacting said base fixating area along contact edges of at least one of said moveable fixating area and said base fixating area, said moveable fixating area defining in correspondence with said base fixating area a form stable adhesive film cavity, said form stable adhesive film cavity being at least partially filled with said adhesive, said moveable fixating area being slideable in a predetermined fashion defined by said contact edges directly contacting an opposing area of one of said moveable fixating area and said base fixating area when said adhesive has said adjustment viscosity, said contact edges being substantially line contacting edges around the boundaries of said form stable adhesive film cavity.

2. The mount and structural element of claim 1, wherein said structural element is selected from the group consisting of functional elements of a laser resonator assembly.

3. The mount and structural element of claim 1, wherein said adhesive is a UV-curing adhesive.

4. A mount for establishing at least one thermally conducting adhesive junction with a structural element, said adhesive junction having a thermal conductivity, said adhesive connection comprising:
    a) a base fixating area being essentially rigid and being part of said mount;
    b) an adhesive having an adjustment viscosity and a fixating viscosity; and
    c) a moveable fixating area being essentially rigid and being part of said structural element, said moveable fixating area contacting said base fixating area along contact edges of at least one of said moveable fixating area and said base fixating area, said moveable fixating area defining in correspondence with said base fixating area a form stable adhesive film cavity, said form stable adhesive film cavity being at least partially filled with said adhesive, said moveable fixating area being slideable in a predetermined fashion defined by said contact edges directly contacting an opposing area of one of said moveable fixating area and said base fixating area with said adhesive film having said adjustment viscosity, said contact edges being substantially line contacting edges around the boundaries of said form stable adhesive film cavity.

5. The mount of claim 4, wherein said adhesive is a UV-curing adhesive.

6. The mount of claim 4, wherein said structural element is selected from the functional elements of a laser resonator assembly.

7. The apparatus of claim 4, wherein said mount is made from sapphire.

8. The apparatus of claim 4, wherein said thermal conductivity is defined by a thickness of said adhesive.

9. The apparatus of claim 4, wherein said thermal conductivity is defined by a thermal conductivity of said adhesive.

10. The apparatus of claim 4, wherein said thermal conductivity is defined by an area extension of said adhesive.

11. A method for fixating a structural element in a predetermined position relative to a mount, wherein said structural element comprises a moveable fixating area defining an adhesive junction together with a base fixating area of said mount, said method comprising following steps:
    a) providing an adhesive having an adjustment viscosity and a fixating viscosity;
    b) applying the adhesive on at least one of said moveable fixating area and said base fixating area;
    c) directly contacting one of said moveable fixating area and said base fixating area with contact edges of said one of said moveable fixating area and said base fixating area and containing said adhesive in a film cavity defined by said moveable fixating area kept in a predetermined distance to said base fixating area by said contact edges;
    d) defining said predetermined position by moving said structural element along said contact edges; and
    e) fixating said structural element in said predetermined position by establishing said fixating viscosity in said adhesive while opposing a curing deformation of said adhesive by directly contacting said structural element with said mount via said contact edges, said contact edges being substantially line contacting edges around the boundaries of said form stable adhesive film cavity.

12. The method of claim 11, wherein said adhesive is a UV-curing adhesive, and said step of establishing said fixating viscosity comprises illumination by UV-light.

* * * * *